(12) United States Patent
Petrovic

(10) Patent No.: US 9,505,562 B2
(45) Date of Patent: Nov. 29, 2016

(54) DEVICE AND METHOD FOR ACCUMULATING AND TRANSFERRING

(71) Applicant: SIDEL PARTICIPATIONS, Octeville-sur-Mer (FR)

(72) Inventor: Zmaj Petrovic, Reichstett (FR)

(73) Assignee: GEBO PACKAGING SOLUTIONS FRANCE, Reichstett (FR)

( * ) Notice: Subject to any disclaimer, the term of this patent is extended or adjusted under 35 U.S.C. 154(b) by 0 days.

(21) Appl. No.: 14/443,150

(22) PCT Filed: Nov. 7, 2013

(86) PCT No.: PCT/FR2013/052658
§ 371 (c)(1),
(2) Date: May 15, 2015

(87) PCT Pub. No.: WO2014/076390
PCT Pub. Date: May 22, 2014

(65) Prior Publication Data
US 2015/0291367 A1    Oct. 15, 2015

(30) Foreign Application Priority Data

Nov. 16, 2012  (FR) .................................. 12 60926
Apr. 16, 2013  (FR) .................................. 13 53421

(51) Int. Cl.
*B65G 1/00*  (2006.01)
*B65G 37/00*  (2006.01)
*B65G 47/51*  (2006.01)

(52) U.S. Cl.
CPC ........... *B65G 47/5113* (2013.01); *B65G 37/00* (2013.01); *B65G 2201/0244* (2013.01)

(58) Field of Classification Search
CPC ........ B65G 1/00; B65G 1/02; B65G 47/268; B65G 47/53; B65G 47/56; B65G 47/681

USPC ............ 198/347.4, 426, 431, 432, 433, 571, 198/572
See application file for complete search history.

(56) References Cited

U.S. PATENT DOCUMENTS 5,267,821 A * 12/1993 Bodart ............... B65G 47/5109
198/347.4
5,308,001 A *  5/1994 Grecksch ............... D01H 9/187
198/347.4

(Continued)

FOREIGN PATENT DOCUMENTS

| CH | 702211 | 5/2011 |
|---|---|---|
| DE | 103 12 695 A1 | 10/2004 |
| DE | 20 2006 009652 U1 | 10/2007 |
| EP | 0709315 | 5/1996 |
| EP | 2233412 | 9/2010 |
| WO | 2011-028138 | 3/2011 |

OTHER PUBLICATIONS

International Search Report, dated Jan. 23, 2014, from corresponding PCT application.

*Primary Examiner* — James R Bidwell
(74) *Attorney, Agent, or Firm* — Young & Thompson

(57) ABSTRACT

A device (2) for accumulating and transferring objects includes: a feed conveyor (6), a discharge conveyor (8), an accumulation surface (27), a first transfer element (18) for moving at least one batch of objects from the feed conveyor to the accumulation surface, a second transfer element (7) for moving at least one batch of objects from the accumulation surface to the output conveyor. At least one of the first and second transfer element includes a robotic handling device (18) provided with a handling head (17) for at least one batch of objects. The accumulation surface (27) is a conveyor (7) which forms the second transfer element and the direction of which is inclined and preferably perpendicular to the direction of conveyance of the input conveyor (6).

20 Claims, 13 Drawing Sheets

(56) References Cited

U.S. PATENT DOCUMENTS

| | | | |
|---|---|---|---|
| 5,829,574 A | 11/1998 | DelSanto | |
| 6,170,635 B1 * | 1/2001 | Rommelli | B65G 47/5127 |
| | | | 198/429 |
| 6,296,103 B1 * | 10/2001 | Gross | B26D 7/0675 |
| | | | 198/429 |
| 6,609,605 B1 * | 8/2003 | Linder | B65G 47/5104 |
| | | | 198/347.1 |
| 8,491,249 B2 | 7/2013 | Monti | |
| 2006/0070847 A1 * | 4/2006 | Besch | B65G 1/0492 |
| | | | 198/347.4 |
| 2009/0175691 A1 | 7/2009 | Hirschek | |
| 2010/0243501 A1 | 9/2010 | Monti | |
| 2012/0219397 A1 | 8/2012 | Baker | |

\* cited by examiner

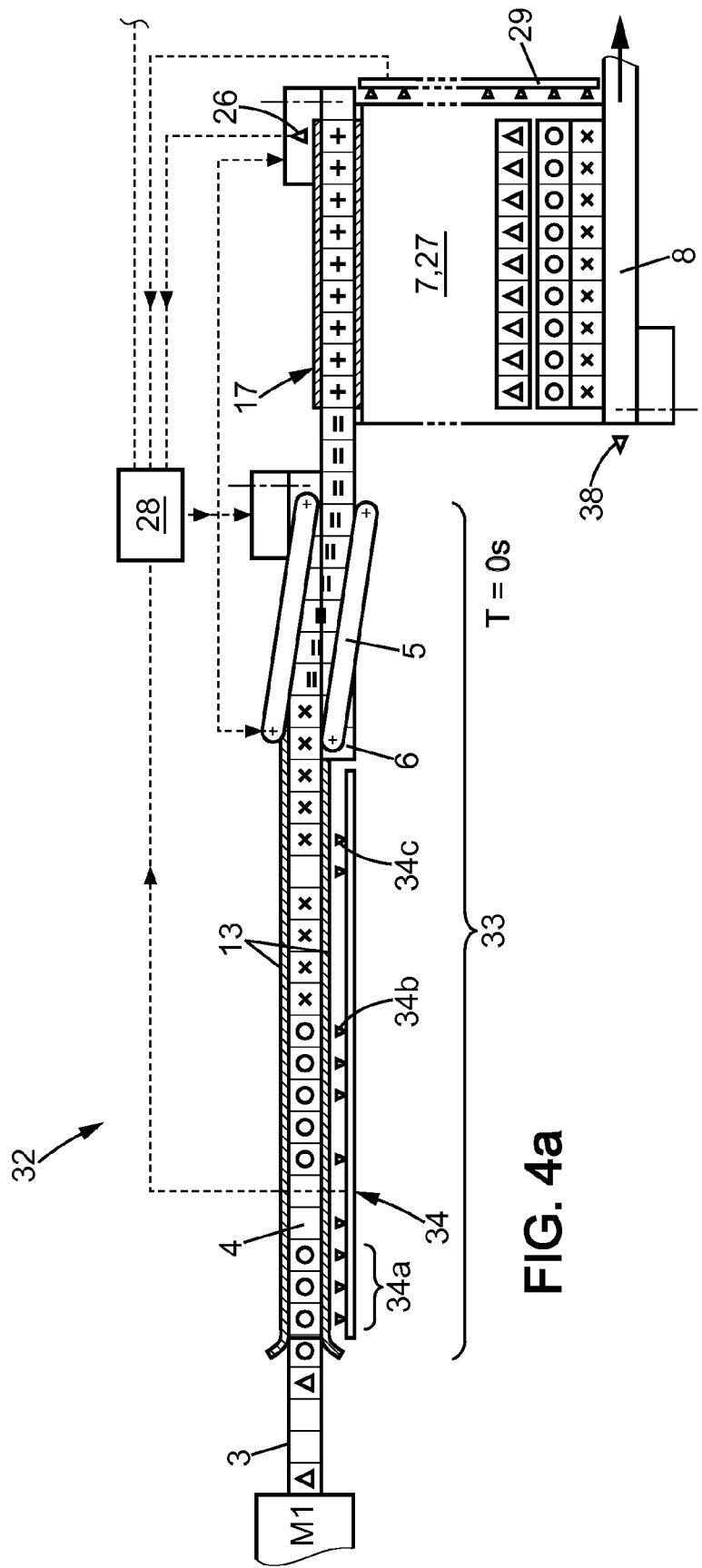

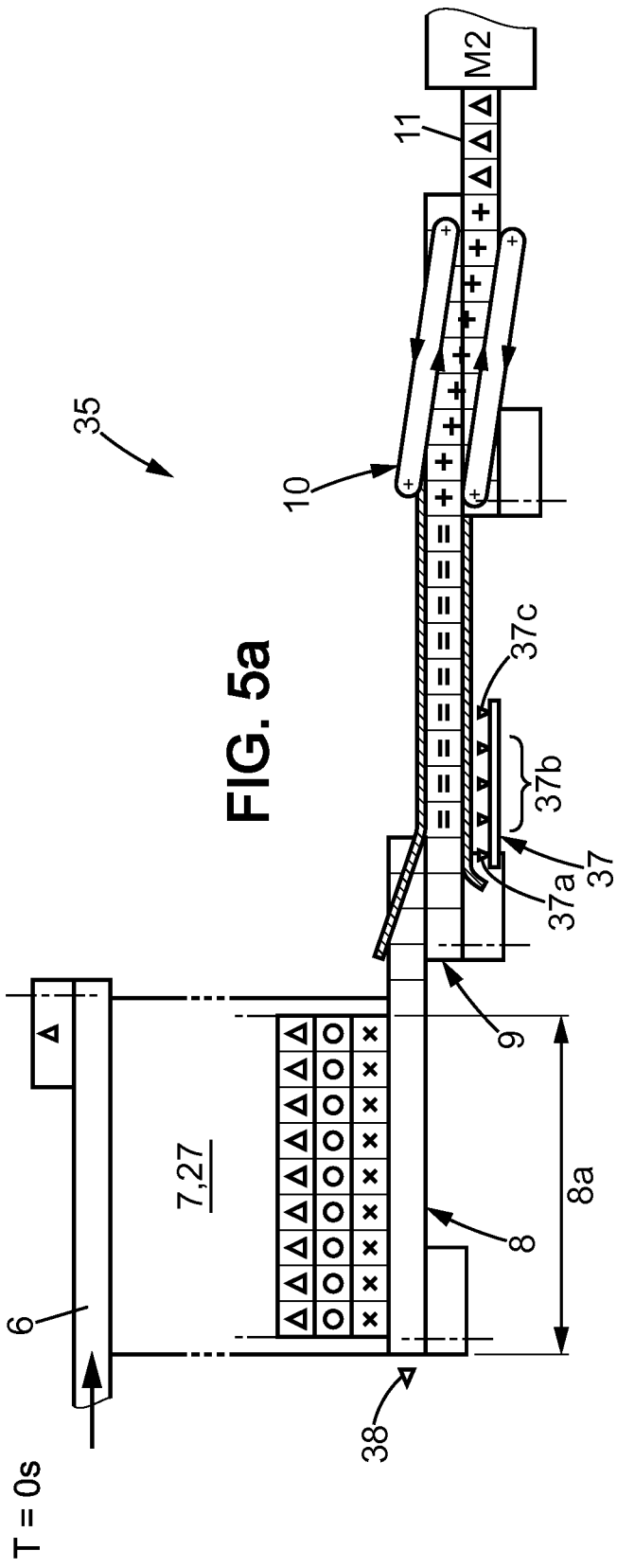

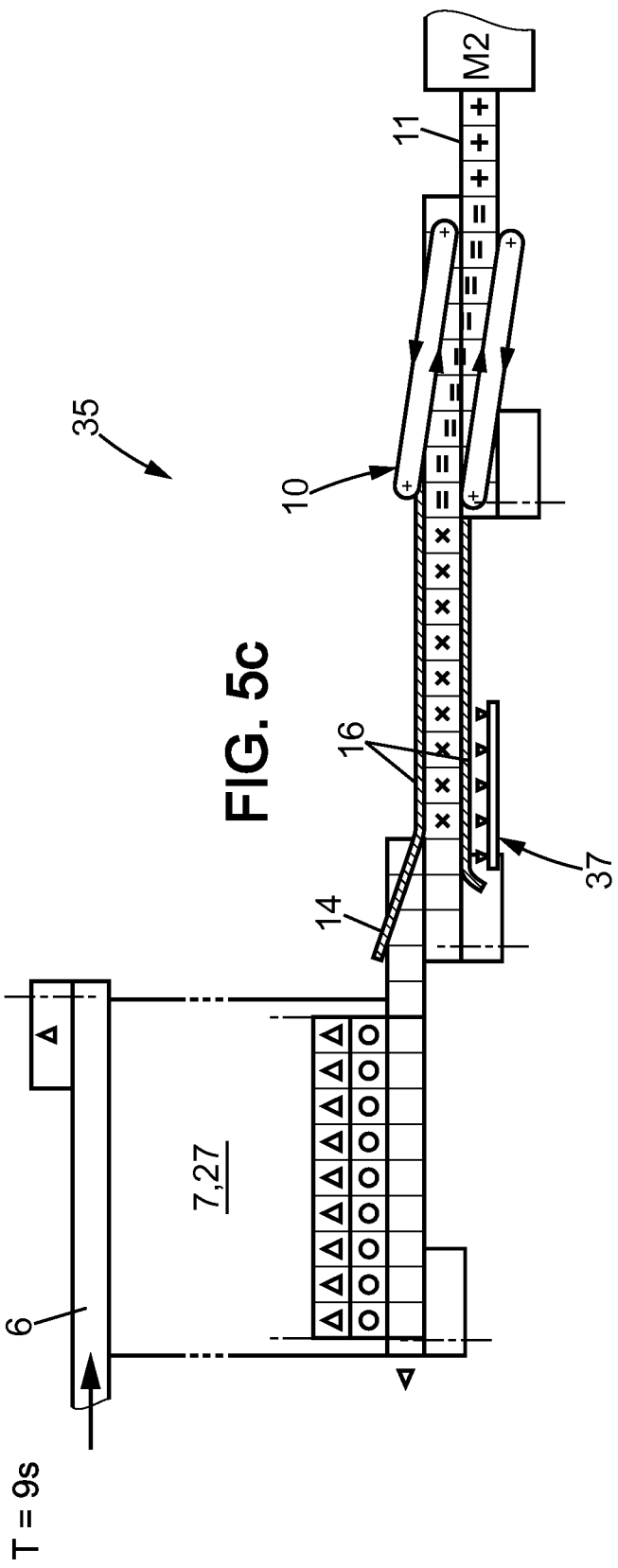

DEVICE AND METHOD FOR ACCUMULATING AND TRANSFERRING

FIELD OF THE INVENTION

The invention relates to the field of devices and methods for accumulating and conveying objects.

The invention relates in particular to accumulation tables that convey objects between two machines that process objects on a line. The accumulation makes it possible for the stopping of the machine downstream not to cause the machine upstream to stop, and vice versa.

The invention relates in particular to the accumulation of containers such as food cartons.

STATE OF THE ART

The application DE 103 12 695 describes an accumulation and conveying device for containers. This device comprises a switching of an input track to N single-line storage conveyors and a collection switching of the N conveyors to an output track. The single-line storage conveyors are driven independently from one another. There exists a need to simplify the design and reduce the cost of this type of device. There also exists a need to maximize the ratio of the usable surface to accumulate objects on the layout area of the device in the factory.

OBJECT AND SUMMARY OF THE INVENTION

The invention proposes a device and a method for accumulating and conveying objects that meet at least one of the above-mentioned needs.

An object of the invention is to simplify the design of accumulation tables.

According to a first aspect, the invention pertains to a device for accumulation and transfer of objects comprising:
- a feed conveyor, featuring a downstream portion that extends in a conveying direction,
- an output conveyor, featuring an upstream portion that extends in the conveying direction,
- an accumulation surface,
- a first transfer means to move at least one batch of objects from the feed conveyor onto the accumulation surface,
- a second transfer means to move at least one batch of objects from the accumulation surface onto the output conveyor.

According to the invention, at least one of the first and second transfer means comprises a robotic manipulator equipped with a head for manipulation of at least one batch of objects. Furthermore, the accumulation surface comprises an upstream side, adjacent to the downstream portion of the feed conveyor, and a downstream side, opposite the upstream side in an accumulation direction that is inclined relative to at least one of the conveying directions, with said downstream side being adjacent to the upstream portion of the output conveyor.

It is understood that the manipulation head can simultaneously pick up all the objects of the transferred batch to perform either the first or the second transfer and return to the starting position of the transfer to transfer a new batch. The cycle time to achieve this transfer can correspond to the average speed of the conveyor, feed or output that deals with this transfer. Thus, it is no longer necessary to form parallel lines conveyed by multiple conveyors that are individually powered and each operated successively. The robotic manipulator makes it possible to reduce the number of moving parts.

The accumulation direction is for example perpendicular to the conveying direction of the feed conveyor or of the output conveyor that deals with the transfer by the robotic manipulator.

Advantageously, one of the first and second transfer means comprises said robotic manipulator, with the other of said first and second means comprising an accumulation conveyor equipped with a rotary mat, with said rotary mat extending along said accumulation surface and being driven in a conveying direction that is approximately perpendicular to a conveying direction of the feed or output conveyor that deals with the transfer. The deviation relative to the perpendicular of the angle between said conveying directions is less than 10°, and preferably less than 5°.

The robotic manipulator can have three axes of movement, such that the manipulation head is able to move forward at the speed of the feed or output conveyor that deals with the transfer. Thus, the transfer can occur without stopping the feed or output conveyor.

Advantageously, the batches of objects are rows of objects aligned behind one another. The length of the row of objects corresponds to the width of the accumulation conveyor. The rows of objects transferred follow one behind the other on the feed conveyor. They are then placed on the accumulation conveyor, parallel to one another. The last rows to arrive on the accumulation surface are placed behind the rows that have previously arrived, in the conveying direction of the accumulation conveyor.

In the case where the accumulation conveyor corresponds to the second transfer means, the perpendicularity between the conveying direction of the accumulation conveyor and that of the output conveyor has the effect that the accumulation conveyor can provide an entire row of objects directly to the output conveyor. As the accumulation conveyor moves forward, it is cleared and the row that is the last to arrive approaches the output conveyor. In the case where the accumulation conveyor corresponds to the first transfer means, it is filled as the accumulation conveyor moves forward. The row that is the first to arrive is moved away from the output conveyor.

According to one embodiment, the device further comprises a means for determining a fill rate in progress on the accumulation surface and a control unit for the robotic manipulator that is connected to said determination means, and in which the manipulation head can move between a predetermined position above the feed or output conveyor and a variable position above the accumulation surface, with said variable position being determined by the central processing unit as a function of the fill rate in progress.

In the case where an accumulation conveyor ensures the second transfer, knowledge of the fill rate in progress makes it possible for the robot to bring the row that it is transferring to a point behind the rows already present on the accumulation surface. In the case where a robot ensures the second transfer, knowledge of the accumulation rate in progress makes it possible for the robot to take the first row accumulated wherever it is at this moment on the accumulation surface.

Advantageously, when the first transfer means comprises a robotic manipulator, the variable destination position of the transferred row is determined so as to push the rows of objects that have been previously transferred against one another and that are still on the accumulation surface.

Advantageously, the manipulation head can move vertically between an active position and a retracted position and comprises a first lateral pusher that extends parallel to the conveying direction of the feed or output conveyor and is designed to extend in active position all along one exterior side of the batch of objects to be transferred.

Advantageously, the manipulation head is a U-shaped cap, with the shape of the U being visible in a plane that is perpendicular to the conveying direction of the feed or output conveyor. That makes it possible for a row of objects to be withdrawn from the feed conveyor (or brought to the output conveyor) by a simple lateral translation of the U-shaped cap.

Advantageously, the device comprises a device for feeding the objects that includes the feed conveyor and an intermediate accumulation means situated upstream from the feed conveyor. The intermediate accumulation makes it possible to fill the spaces between objects exiting, for example, from an upstream machine for processing the objects. That makes it possible to guarantee that the objects arriving onto the feed conveyor are in contact, or almost in contact, as they follow one another. That makes it possible for the different rows on the accumulation surface to be free of gaps between the objects. That makes it possible to maximize the use of the accumulation surface. In the case where an accumulation conveyor ensures the output transfer, that makes it possible for two rows from the accumulation conveyor to push a third row onto the output conveyor.

Advantageously, the device comprises an output device for the objects that includes the output conveyor and an intermediate accumulation means situated downstream from the output conveyor. That is particularly useful when the output transfer is provided by a perpendicular accumulation conveyor. The output conveyor can be halted to receive a row of objects. During this stop, the downstream machine for processing the objects can be fed with objects by drawing from the intermediate accumulation situated downstream from the output conveyor. The discharge speed of the row of objects that arrives on the output conveyor makes it possible to rebuild this intermediate accumulation. In other words, the intermediate accumulation downstream from the output conveyor makes it possible to fill any spaces between the different sets of objects consisting of the successive rows exiting the accumulation conveyor.

Advantageously, the intermediate accumulation means comprises an intermediate conveyor with a smooth mat, followed by a braking device.

According to one embodiment, if the robotic manipulator constitutes the first transfer means, the manipulation head is designed to grasp the batch of objects to be transferred with a speed of the manipulation head that is identical to a conveying speed of the feed conveyor.

According to one embodiment, if the robotic manipulator constitutes the second transfer means, the manipulation head is designed to deposit the batch of transferred objects with a speed of the manipulation head that is identical to a conveying speed of the output conveyor.

The two embodiments above make it possible to convey and to accumulate unstable objects without having to stop the corresponding feed or output conveyor. This embodiment is particularly suitable for a device where the two transfer means each comprise a manipulation head. The embodiment with two robots is also suitable for accumulating non-stackable objects such as oblong-shaped objects.

According to another embodiment, the second transfer means comprises a robotic manipulator, which can be the same as the manipulator of the first transfer means, but is preferably a different manipulator. The objects are situated in rows on the accumulation surface and the output conveyor is a multi-track conveyor. The manipulation head of the robotic manipulator has at least one pusher. The robotic manipulator then exerts a pushing force on a number of rows of objects that is greater than two.

It is thus possible to go from a single track feed conveyor to a multi-track output conveyor without the addition of an additional switching-type device.

For example, the robotic manipulator exerts a pushing force on a number of rows of objects corresponding to the number of tracks of the output conveyor, so as to fill all the tracks of the output conveyor in a single operation of the robot.

According to another aspect, the invention relates to a method of transferring batches of objects from a feed conveyor to an output conveyor,
  using a first means for transfer of at least one batch of
    objects from the feed conveyor onto an accumulation
    surface,
  and a second means for transfer of at least one batch of
    objects from the accumulation surface onto the output
    conveyor.

Advantageously, at least one of the transfer means takes into account the fill rate in progress on the accumulation surface.

Advantageously, each of the first and second transfer means is synchronized in terms of flow rate of objects with the corresponding feed or output conveyor.

Advantageously, the feed conveyor is halted when the batch of objects is transferred from said conveyor and the feed conveyor is accelerated up to a catchup overspeed so that the mean transfer flow rate is equal to the mean feed flow rate.

Advantageously, the output conveyor is halted when the batch of objects is transferred onto said conveyor, and the output conveyor is accelerated up to a catchup overspeed so that the mean transfer flow rate is equal to the mean output flow rate.

BRIEF DESCRIPTION OF THE DRAWINGS

This invention will be better understood from the study of the detailed description of several embodiments taken as non-limiting examples and illustrated by the accompanying drawings in which:

FIGS. 5a, 5b, 5c illustrate a device for output to a downstream machine and respectively three steps of the corresponding transfer method.

DETAILED DESCRIPTION

Figure 1:
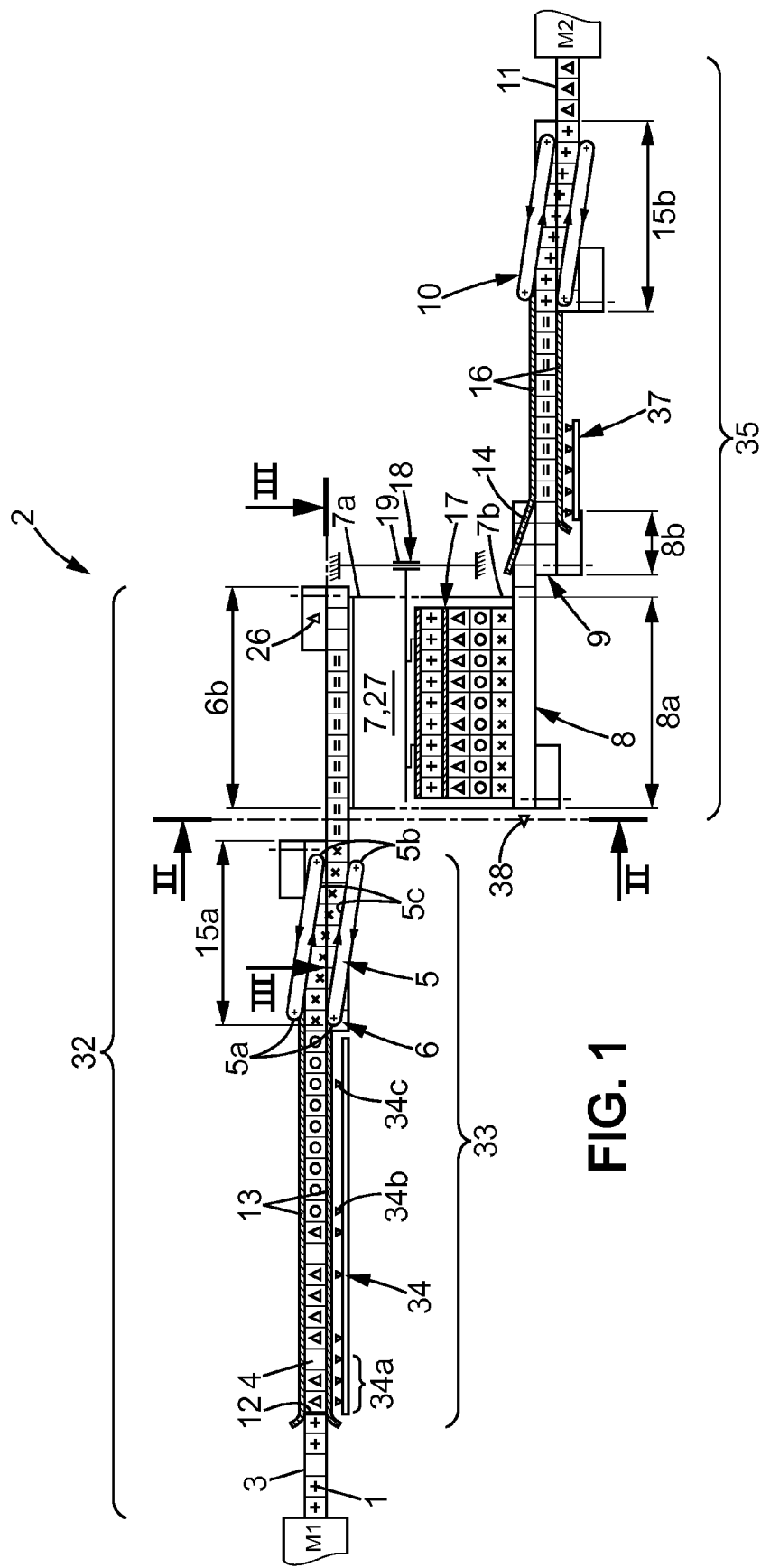
FIG. 1 is a top view of an embodiment of the accumulating and conveying device.

An upstream machine M1 and a downstream machine M2 both process, and independently from one another, objects 1 located on a line. An accumulating and conveying device 2 is placed between the machines M1 and M2. The accumulating and conveying device 2 comprises successively: an upstream conveyor 3, an upstream intermediate conveyor 4, two upstream braking track belts 5, a feed conveyor 6, an accumulation conveyor 7, an output conveyor 8, a downstream intermediate conveyor 9, two downstream braking track belts 10, and a downstream conveyor 11.

The upstream conveyor 3 and the upstream intermediate conveyor 4 are in alignment with one another and are connected by, for example, a connecting plate 12. The upstream intermediate conveyor 4 and the feed conveyor 6 are parallel and side by side on an axial overlay area 15a. The two upstream braking track belts 5 are situated across the two conveyors 4, 6 above the axial overlay area 15a. Two lateral guides 13 extend on each side of the upstream intermediate conveyor 4 over the entire length of this conveyor, upstream from the two upstream braking track belts 5 and separated from one another by a distance corresponding to the width of the objects 1.

The two upstream braking track belts 5 each have an active face 5c. The two active faces 5c are parallel and opposite one another, extend vertically and are separated by a distance corresponding to the width of the objects 1. Upstream ends 5a of the two active faces 5c are situated above an upstream portion of the axial overlay area 15a, on both sides of the width of the upstream intermediate conveyor 4. Downstream ends 5b of the active faces 5c are situated above a downstream portion of the axial overlay area 15a, on both sides of the width of the feed conveyor 6.

The accumulation conveyor 7 has a conveying direction, referred to as the accumulation direction. An upstream end 7a of the accumulation conveyor 7 is adjacent to a downstream portion 6b of the feed conveyor 6 and extends along the portion 6b. A downstream end 7b of the accumulation conveyor 7, opposite the upstream end 7a in the direction of accumulation, is adjacent to an upstream portion 8a of the output conveyor 8 and extends along the portion 8a. The downstream portion 6b of the feed conveyor 6 extends in a first conveying direction, and the upstream portion 8a of the output conveyor 8b extends in a second conveying direction. The direction of accumulation is inclined relative to the first conveying direction and/or relative to the second conveying direction. According to one embodiment, which is that illustrated in the figures and which will be described hereafter, the accumulation direction is perpendicular to the first conveying direction and to the second conveying direction, with the two conveying directions thus being parallel.

The output conveyor 8 and the downstream intermediate conveyor 9 are parallel and side by side, along a downstream portion 8b of the output conveyor 8. A diverter 14 extends vertically, across the downstream portion 8b, and is oriented so that an object 1, driven by the output conveyor 8, is pushed against the diverter 14, and is diverted onto the downstream intermediate conveyor 9.

The downstream intermediate conveyor 9 and the downstream conveyor 11 are parallel and side by side along an axial overlay area 15b, downstream from the downstream intermediate conveyor 9 and upstream from the downstream conveyor 11. The downstream braking track belts 10 have structural characteristics that are identical to those described previously for the downstream braking track belts 5. Their inclined orientation makes it possible to guide and to hold the objects 1 that arrive from the downstream intermediate conveyor 9 toward the downstream conveyor 11.

A lateral guide 16 extends the diverter 14 all along the downstream intermediate conveyor 9 as far as the downstream braking track belts 10. Another lateral guide 16 extends on the opposite lateral side of the downstream intermediate conveyor 9, at a distance from it that corresponds to the width of the objects 1.

The device 2 comprises a first means for transferring a row of objects from the feed conveyor 6 onto an accumulation surface 27 on the top of the conveyor 7. It comprises a second means for transfer from the accumulation surface 27 onto the output conveyor 8.

More specifically, the accumulation surface 27 comprises an upstream side, adjacent to the downstream portion 6b of the feed conveyor 6, and a downstream side, adjacent to the upstream portion 8a of the output conveyor 8, and opposite the upstream side in the direction of accumulation. Thus, the first transfer means brings an object row from the downstream portion 6b of the feed conveyor 6 onto the upstream side of the accumulation surface 27, and the second transfer means brings an object row from the downstream side of the accumulation surface 27 onto the upstream portion 8a of the output conveyor 8. In the particular embodiment in which the accumulation surface 27 is carried by the accumulation conveyor 7, the upstream side of the accumulation surface 27 extends from the upstream end 7a of the conveyor 7, and the downstream side of the accumulation surface 27 extends from the downstream side 7b of the conveyor 7.

Figure 2:
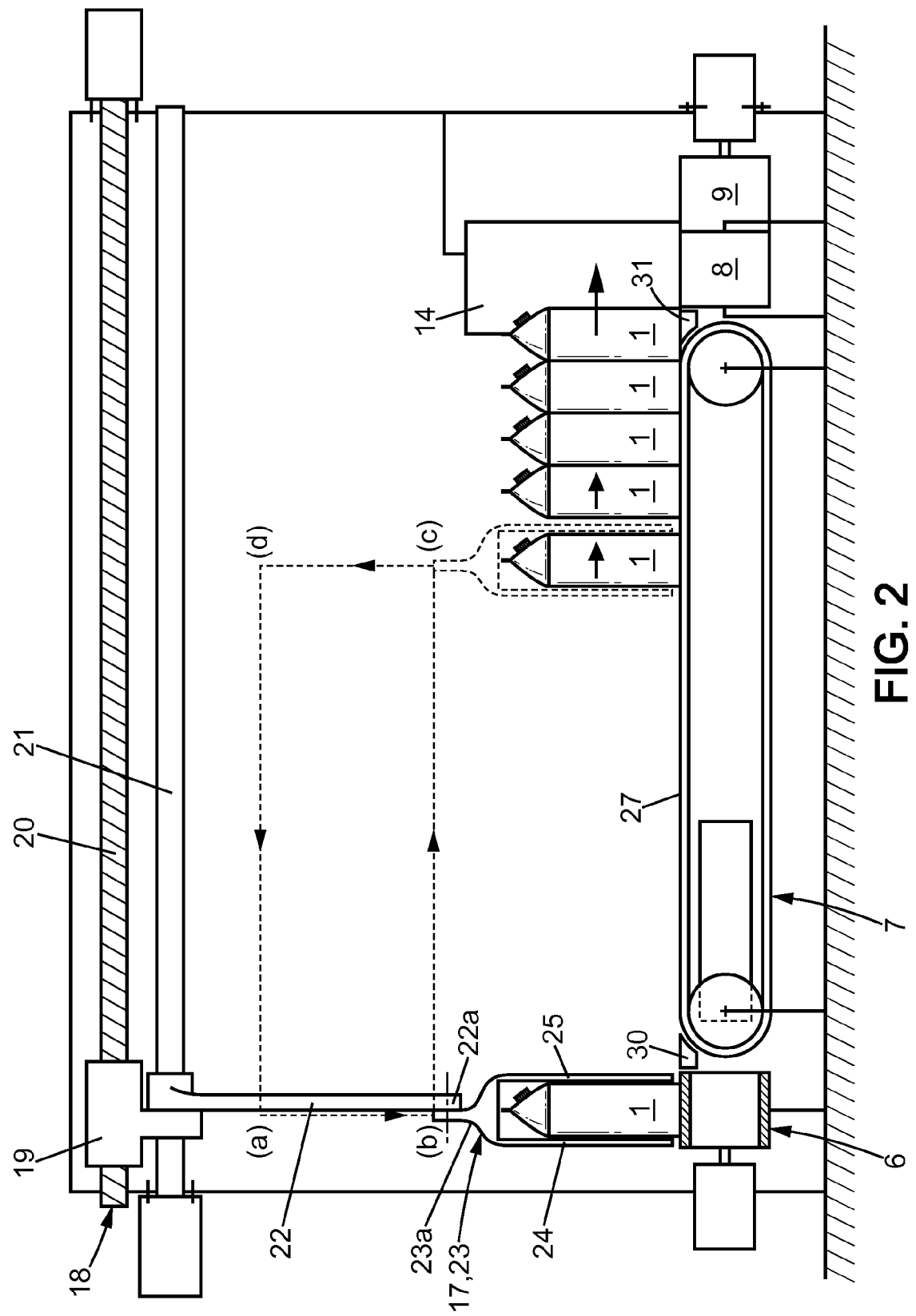
FIGS. 2 and 3 are sections, respectively along the planes II-II and III-III of FIG. 1, FIGS. 4a, 4b, 4c illustrate a device for feeding the objects from an upstream machine and respectively three steps of the corresponding transfer method.
Figure 3:
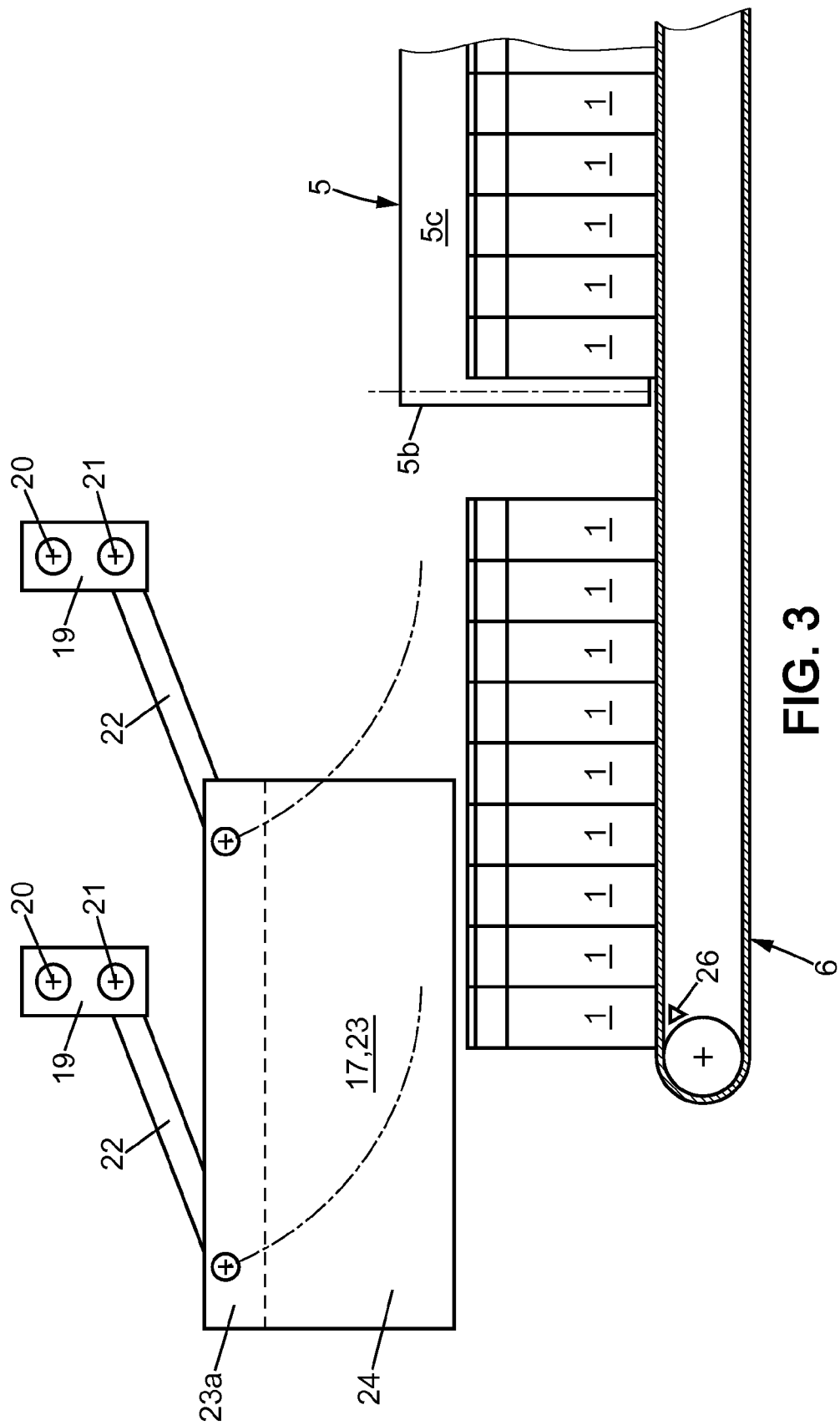

The first means comprises a robot 18 that is equipped with a manipulation head 17 that can move at least horizontally, at least in the conveying direction. As shown in FIGS. 2 and 3, the robot 18 has two translation units 19, each mounted on, and driven by, a threaded guide rod 20. Each of the two translation units 19 is also penetrated by an auxiliary rod 21 that is parallel to the corresponding rod 20. Each of the units 19 is also provided with a link rod 22 that is driven in rotation by a key, not shown, of the auxiliary rod 21. One end 22a of each of the connecting rods 22 is mounted in rotation on an upper part 23a of a cap 23. The cap 23 has a straight section in a vertical plane that is parallel to the conveying direction of the accumulation conveyor 7. Said straight section has a U-shape that is open downward. The cap 23 has a first side 24 located on an upstream side, i.e., on the exterior side of the device 2, and a second side 25 located on a downstream side of the accumulation conveyor 7.

Now the operation of the robot 18 will be described using FIGS. 1, 2, 3, 4a. In a position (a) in FIG. 2, the manipulation head 17 is in the retracted position, as illustrated in FIG. 3. From this initial position (a), a transfer cycle is initialized when a sensor 26 detects that a row has arrived in position on the downstream portion 6b of the feed conveyor 6, ready to be picked up. The rod 21 is then actuated to cause the manipulation head 17 to come down into an active position (b), illustrated in solid lines in FIG. 2. During the descent, and before the arrival in active position (b), the feed conveyor 6 is halted. When the manipulation head 17 is in the active position (b), the threaded rod 20 is actuated to move the manipulation head 17 laterally into a destination position (c) of the first transfer.

This destination position (c) is located on an upper face of the accumulation conveyor 7, which is the part of the surface of the accumulation conveyor 7 that can be used to accumulate objects 1, forming the accumulation surface 27. The destination position (c) is shown in dotted lines in FIG. 2. It is located essentially behind the row that had been brought up previously.

A control unit 28, which is connected to a battery of sensors 29, detects the presence of rows of objects on the accumulation surface 27. The control unit 28 then determines a level of occupation in progress of the accumulation surface 27. It derives therefrom the position of the last row present on the accumulation surface 27 and thus calculates the destination position (c) to which the robot 18 must bring the row of objects.

The robot 18 imparts an acceleration to the manipulation head 17 during which the objects 1 are pushed by the upstream first side 24 of the cap 23.

In the example shown, the cap 23 does not lift the row of objects 1 transferred. The objects 1 slide along a transfer plane which extends from the upstream conveyor 6 on the accumulation conveyor 7 while passing over a transfer plate 30. The downstream second side 25 of the cap 23 makes it possible for the robot to impose a rapid deceleration on the transferred row of objects without creating the risk of the objects 1 falling. That makes it possible to accelerate the first transfer and to reduce the cycle time. That can make it possible for the accumulating and conveying device 2 to accept high feed rates of the objects 1.

Once the rod 21 has arrived at the destination position (c), it is again actuated to raise the manipulation head 17 into a retracted position (d) in which said head is entirely above the tops of the objects 1. That then makes it possible to actuate the rod 20 to bring the manipulation head 17 back to a starting position (a).

As shown in FIG. 4a, the existence of a downstream second side 25 has the effect that the row that has just been transferred (illustrated with "Δ's") is not in contact with the previously transferred row (illustrated with "o's"). A space is left that is going to be filled during the transfer of the following row (illustrated in FIG. 4c with "+'s"). During the transfer of the row illustrated by "+'s", the downstream side 25 serves not only to hold the transferred row (with "+'s") but also to push the preceding row (with "Δ's"). In other words, the destination position (c) of the transferred row (with "+'s") is specifically calculated to push the preceding row (with "Δ's") into contact with the one preceding it (with "o's").

It is understood that the first transfer by the robot 18 has numerous variants, the majority of which are independent and can be combined. For example, in one variant, the conveying direction of the feed conveyor can be non-perpendicular to that of the accumulation conveyor. The transfer plate 30 can be triangular, and the robot can cause the manipulation head 17 to pivot.

In another variant, the manipulation head 17 can be a gripper that is able to lift the transferred objects. In particular, the conveyors can be non-coplanar.

In another variant, the manipulation head 17 can be without the downstream second side 25.

In yet another variant, the robot 18 can drive the manipulation head 17 by means that are very different from the rods 20 and 21, such as those used in multi-axis robots.

It is understood that the first transfer is independent of the second transfer. The destination position (c) of the rows of objects by the first transfer is calculated by taking into account the possible movement of the rotary mat of the accumulation conveyor 7. The rate of accumulation in progress, which serves as an instruction to the robot 18, is the one that will be relevant to the moment when the robot 18 will raise the manipulation head 17. However, it can be advantageous for the robot 18 to wait until the mat of the accumulation conveyor 7 is halted to raise the manipulation head 17.

Between the step of the preceding cycle that corresponds to the position (d) and the step of the following cycle where the manipulation head 17 is in destination position (c), the accumulation conveyor 7 can have supplied the output conveyor 8 with a flow of objects that is greater than, equal to or less than the flow of objects of the first transfer. The accumulating and conveying device 2 will then, as a whole, be in a phase respectively of emptying, of cruising or of accumulating. In the accumulation phase, the accumulation conveyor 7 can be completely halted while the robot 18 continues to bring up rows of objects 1.

The second transfer means will now be described using FIGS. 2, 5a, 5b. The transfer of the objects 1 from the accumulation conveyor 7 onto the output conveyor 8 takes place, row by row, by simple friction of the objects on the rotary mat of the accumulation conveyor 7. Thus, the row of objects closest to the output conveyor 8 (illustrated by "x's" in FIG. 5a), i.e., on the downstream side of the accumulation surface 27, is pushed by the rows that follow it and that are still on the rotary mat of the accumulation conveyor 7 (illustrated by "o's" and "Δ's"). The push effect makes it possible for the last row, closest to the output conveyor 8, to slide along a second transfer plane, onto a transfer plate 31, then onto the output conveyor 8, and more specifically of the upstream portion 8a of the output conveyor 8, which can be a rotary mat. In the case where the rotary mats of the conveyors 7 and 8 have similar friction coefficients, the number of rows on the accumulation conveyor 7 must be constantly greater than or equal to two, indeed greater than or equal to three, for this push effect to be sufficient to overcome the friction experienced by the row arriving on the output conveyor 8. The accumulation capacity of the accumulating and conveying device 2 corresponds to the difference between the maximum number of rows that can be housed on the accumulation conveyor 7 minus the minimum number of rows that must remain permanently on the accumulation conveyor 7.

As a variant, the robot 18 can be used as a second transfer means. Thus, in this variant, the robot 18 can move along the same threaded guide rod 20 so that the manipulation head 17 pushes the objects from the accumulation surface 27 onto the output conveyor 8. The accumulation conveyor 7 as a rotary mat then becomes superfluous, since the manipulation head 17 drives the objects, and the accumulation conveyor 7 can be replaced by a stationary accumulation table. In addition, the robot 18 pushes each row of objects, so that the object row closest to the output conveyor 8 has no need to be pushed by the rows that follow it on the accumulation surface 27. It follows that there is no longer any constraint as to a number of rows that must be constantly on the conveyor 7, since the force exerted by the robot 18 on the objects is determined to be always sufficient.

It is understood that the robot 18 can be used as a first transfer means and as a second transfer means, or that a first robot performs the function of a first transfer means and a second robot, separate and independent of the first, performs the function of a second transfer means, as will be seen later on.

The conveying direction of the accumulation conveyor 7, or that of the push of the robot 18, and that of the output conveyor 8 are perpendicular. In a variant, they can have a slight inclination relative to the perpendicular of an angle less than 10°, and indeed less than 5°. That can make it possible for all the objects 1 of a transferred row not to go through the transition between the plate 30 and the output conveyor 8 at the same time. Alternatively, this slight deviation relative to the perpendicular can result from the arrangement of the rows of objects by the manipulation head 17.

A device 32 for feeding the objects 1 between the upstream machine M1 and the accumulation conveyor 7 will be described using FIGS. 4a to 4c. In the embodiment illustrated, the cap 23 is open on each side. The feed conveyor 6 must be halted during the transition between the conveyors 6 and 7.

The feed device 32 includes an intermediate accumulation means 33 located upstream from the feed conveyor 6. More specifically, the intermediate accumulation means 33 is located upstream from the portion of the feed conveyor 6 containing the batch of objects transferred by the first transfer means. That can correspond to the portion of the feed conveyor 6 opposite the accumulation conveyor 7.

The intermediate accumulation means 33 makes it possible to accumulate the objects received from the upstream machine M1 when the feed conveyor 6 is halted. That also makes it possible to fill any "gaps" caused by missing objects at the output of the upstream machine M1. That makes it possible to guarantee that the rows of objects 1 picked up by the manipulation head 17 are "full," i.e., with no objects missing or spaced apart from one another.

The intermediate accumulation means 33 can be made in numerous ways. In the embodiment illustrated, it is made up of the upstream intermediate conveyor 4, the lateral guides 13, the pair of braking track belts 5 and a strip 34 of presence-detection sensors. The strip 34 extends along the lateral guides 13 and comprises, from upstream to downstream: an overfill sensor 34a, a threshold sensor 34b and a fault sensor 34c. Alternatively, the strip 34 of sensors can be replaced with a single sensor and a shift register that receives progress information about the mat. The shift register contains the information about the presence of the objects all along the lateral guides 13.

At the beginning of a transfer cycle (T=0 sec, FIG. 4a), the sensor 26 has detected the arrival of the row (illustrated with "+'s"). The control unit 28 then halts the feed conveyor 6 as well as the braking track belts 5 while the upstream intermediate conveyor 4 continues to convey the objects 1 with a conveying overspeed. The overspeed is greater than the product of the mean flow rate of the upstream machine M1 multiplied by the length of an object 1. The overspeed coefficients of the upstream conveyor 3 and the intermediate conveyors 4 are automatically regulated by the control unit 28 as a function of the signals received by the strip 34 of sensors.

At the initial moment of starting the first transfer illustrated in FIG. 4a, the filling sensors 34a and 34b may have detected one or more missing objects. However, the fault sensor 34c must not have detected any missing object. The objects 1 are blocked by the track belts 5. The objects pushed by the intermediate conveyor gradually accumulate while remaining in line thanks to the lateral guides 13.

Figure 4B:
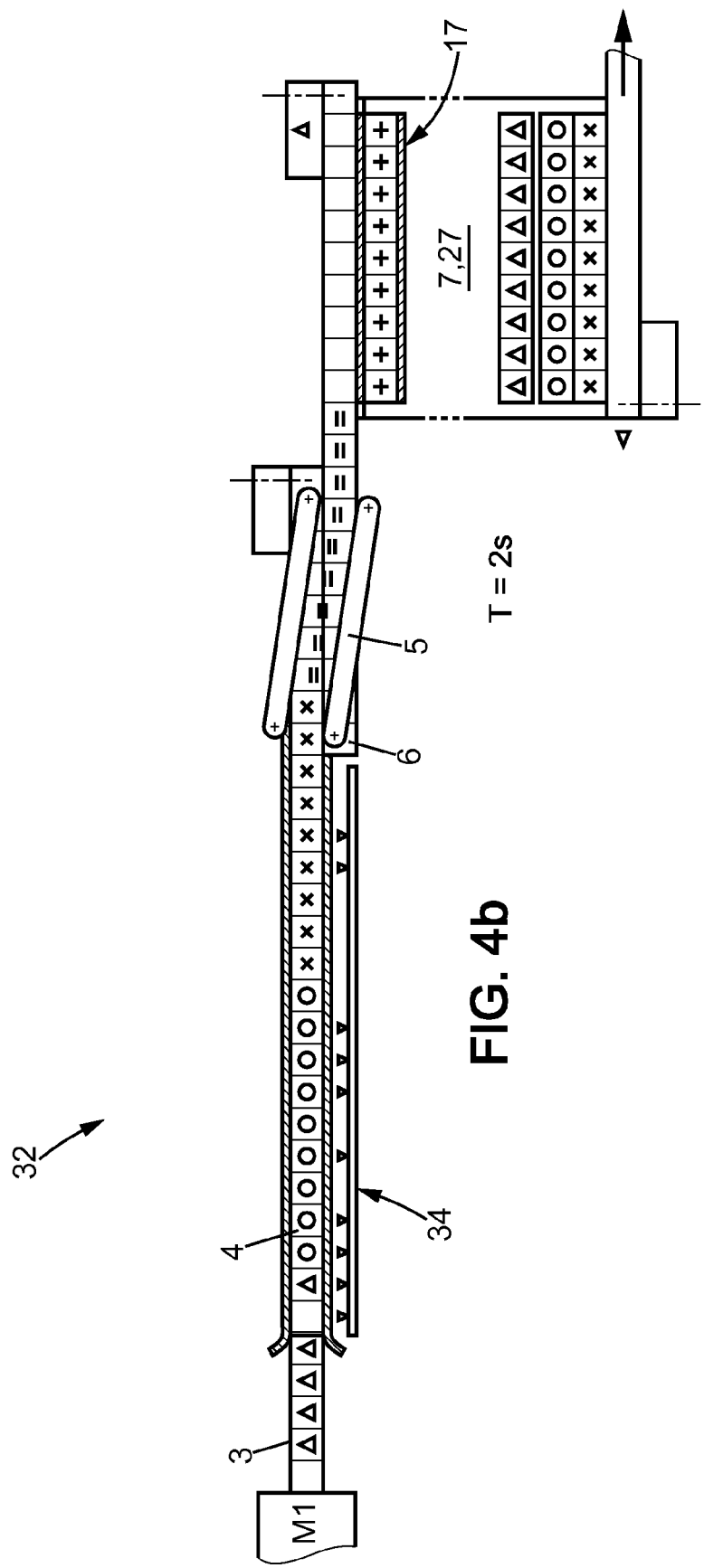
Figure 4C:
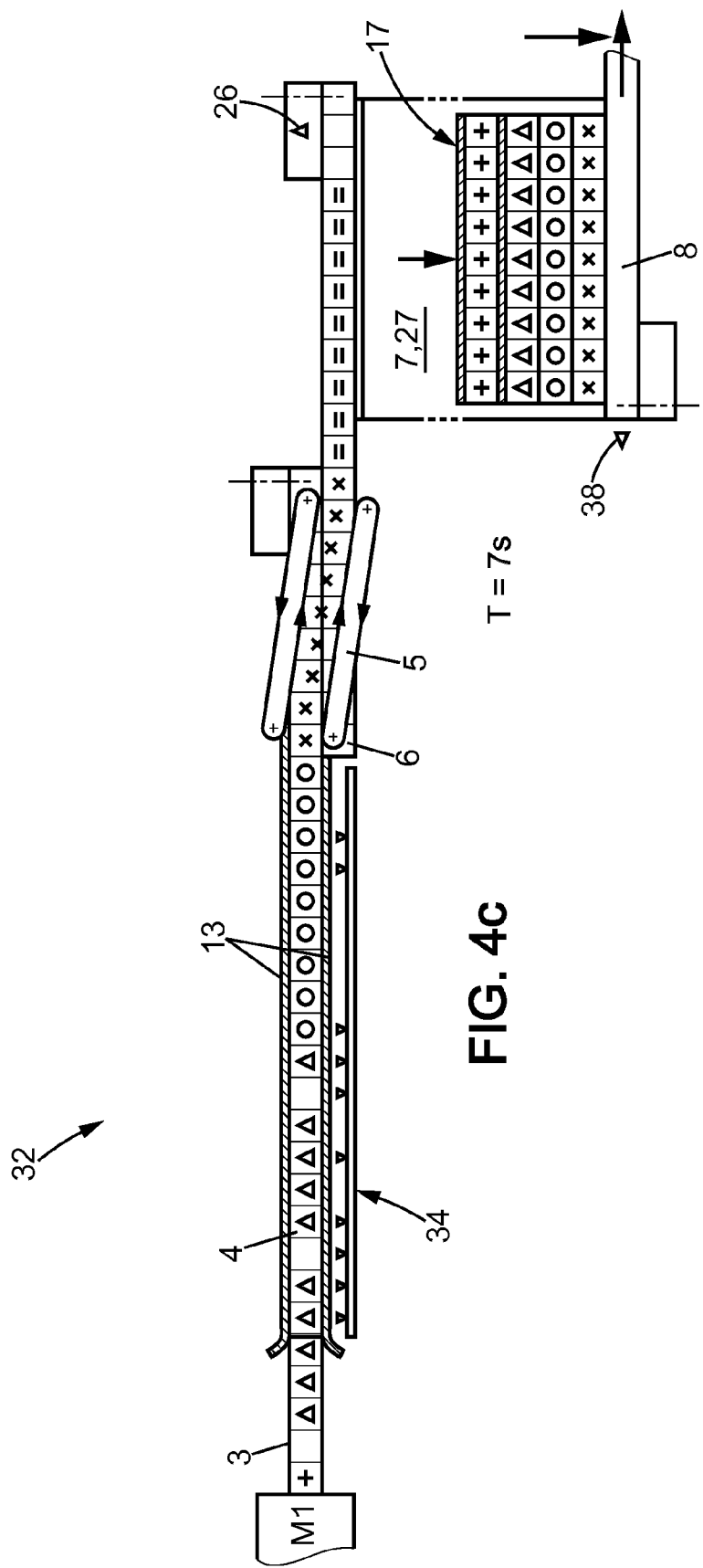

As illustrated in FIG. 4b, the manipulation head 17 has brought the row (illustrated with "+'s") onto the upstream portion of the accumulation surface 27. At this time, the control unit 28 is waiting for the strip 34 of sensors to indicate that the accumulation is at least increased again upstream from the fill threshold sensor 34b, to authorize the restarting of the feed conveyor 6 and the braking track belts 5 (FIG. 4c). That makes it possible to guarantee that no "gap" arrives at the fault sensor 34c during the first transfer cycle. An absence of "gaps" between the overfill sensors 34a and the fill threshold sensor 34b indicates that the overspeed of the intermediate conveyor 4 must be increased. This overspeed can be increased as long as the manipulation head 17 comes back into initial position (a) before the objects 1 are detected by the sensor 26. On the other hand, an excess of "gaps" between the overfill sensor 34a and the fill threshold sensor 34b indicates an excessive overspeed that can be reduced to limit friction on the mat of the intermediate conveyor 4.

It is understood that the intermediate accumulation device 33 upstream from the feed conveyor 6 can have numerous variants. For example, the upstream braking track belts 5 can be replaced with an object blocker situated on the upstream intermediate conveyor 4. This blocker can consist of mobile lateral guides pressing the objects 1 laterally. A diverter can then guide the objects 1 onto the feed conveyor 6 when they are released by the blocker.

Using FIGS. 5a to 5c, an output device 35 will be described that comprises an intermediate accumulation means 36 located between the output conveyor 8 and the downstream machine M2. In the example shown, the intermediate accumulation means 36 consists of the downstream intermediate conveyor 9, the diverter 14, the lateral guides 16, the downstream braking track belts 10 and a strip 37 of sensors comprising an overfill sensor 37a, fluctuation zone sensors 37b and a fault sensor 37c. At the beginning of an output transfer cycle (illustrated in FIG. 5a), the upstream portion 8a of the output conveyor 8 must be completely empty to receive a new row (illustrated with "x's"). The output conveyor 8 is halted. The downstream braking track belts 10 are directly synchronized with the downstream conveyor 11 and with the downstream machine M2, to be able to feed them with objects 1 that are in contact following one another as a function of what the downstream machine M2 requires.

Figure 5B:
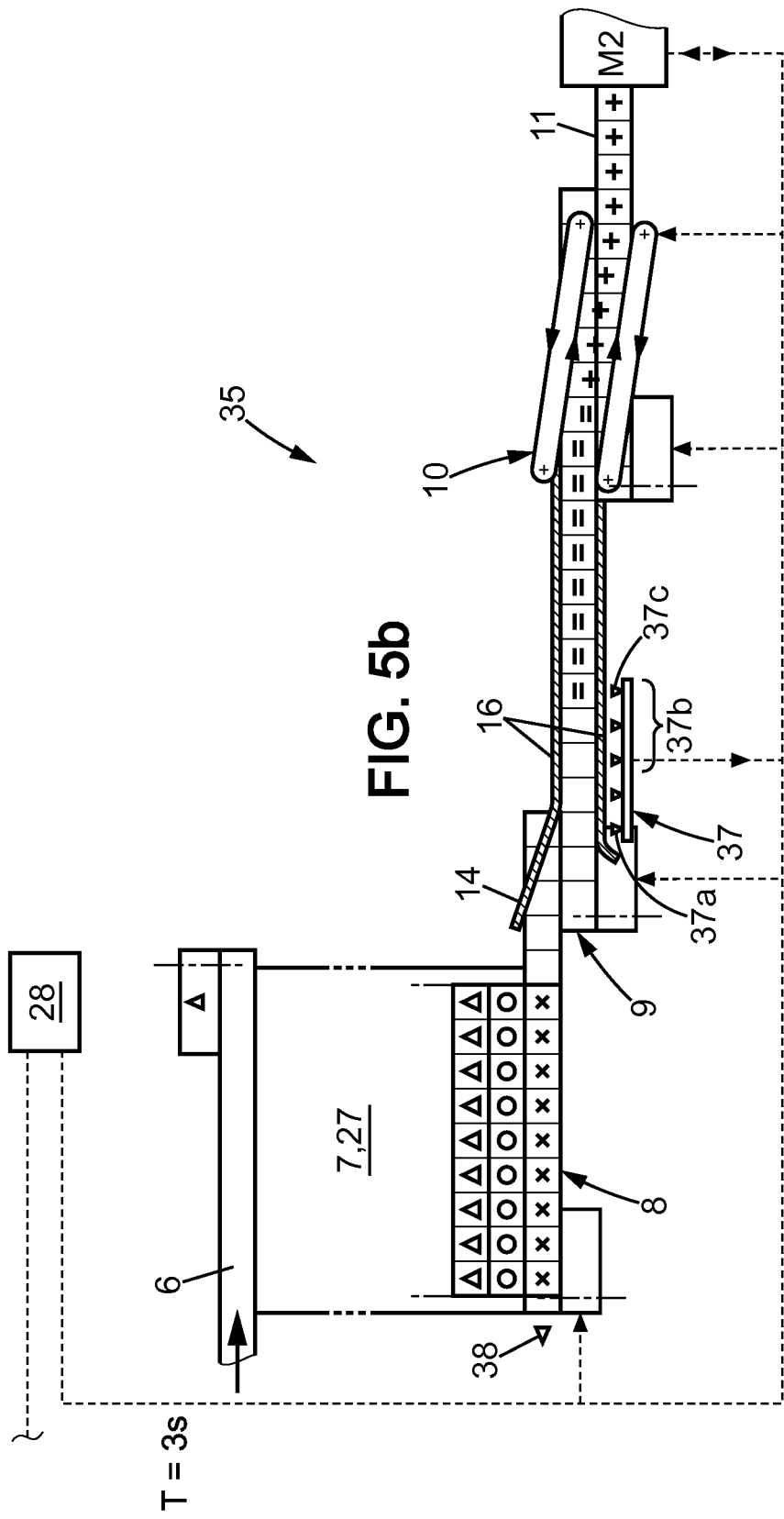

The output transfer cycle comprises two phases, a phase of arrival on the output conveyor (FIG. 5b) and a phase of catching up from the delay (FIG. 5c). In the example illustrated, if the mean flow rate of the second machine M2 is 1 object/second, the time for the transferred row (illustrated by "x's") to arrive on the output conveyor 8 is 3 seconds. That is detected by an arrival sensor 38. During this time, the downstream braking track belts 10 have sent three objects to the machine M2. The fluctuation zone sensors 37b switch from 1 to 0, and the fault sensor 37c remains at 1.

In the catch-up phase, the output conveyor 8 and the downstream intermediate conveyor 9 both advance with an identical overspeed. This overspeed is determined by the control unit 28 such that, during the remaining time (6 seconds) of the transfer cycle, the transferred row (illustrated by "x's") arrives following the preceding row (illustrated by "='s") and takes the place that this row initially had (FIGS. 5a, 5c). That is detected by the fact that the overfill sensor 37a returns to zero after the entire transferred row (illustrated in "x's") has passed by and by the fact that the fluctuation zone sensors 37b have returned to 1.

In a variant, the braking track belts 5 and 10 can be replaced with a horizontal brake mat without the objects being offset laterally between the conveyors 4 and 6, and/or between the conveyors 9 and 11.

Figure 6:
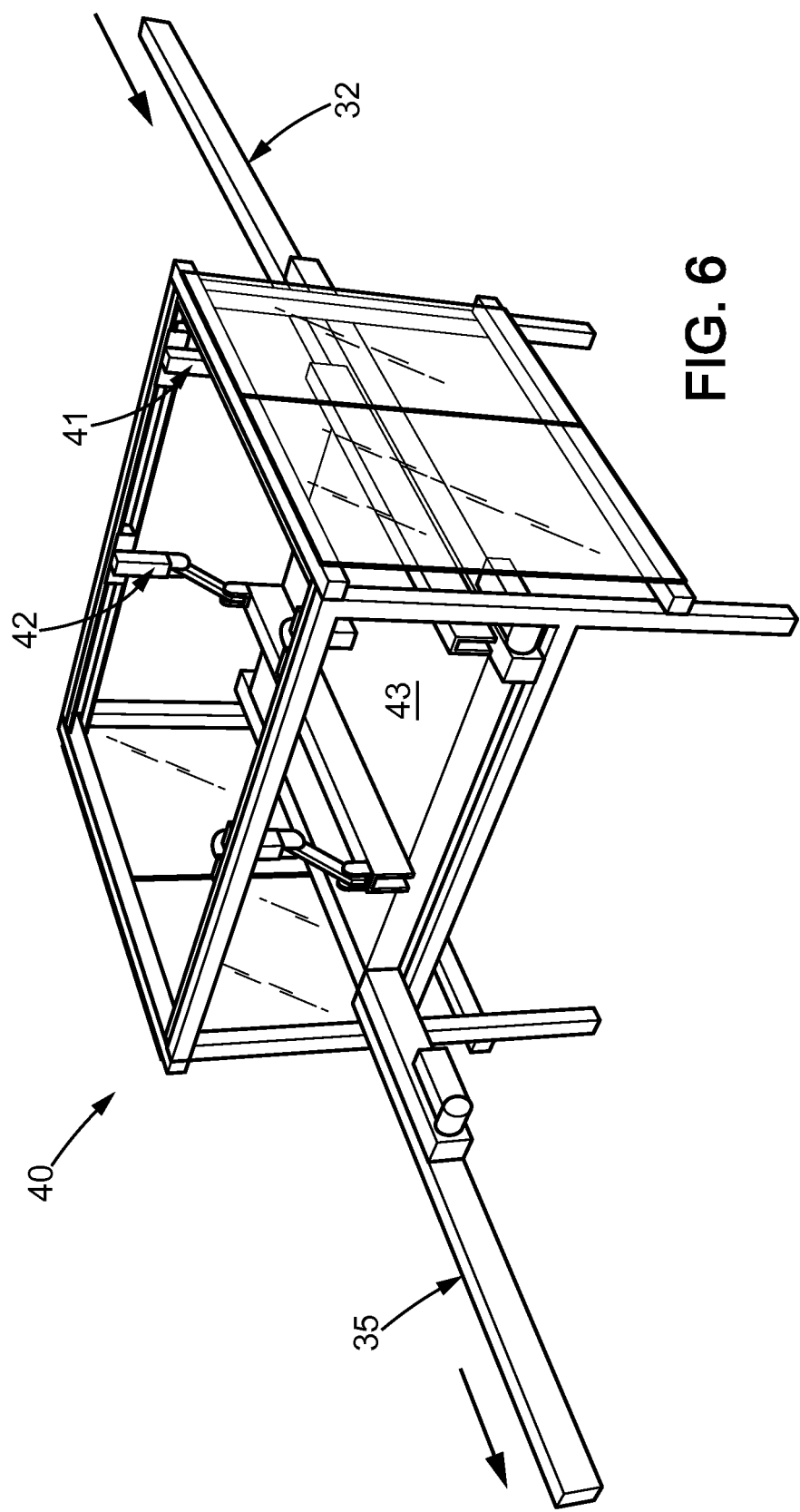
FIG. 6 is a view in perspective of a second embodiment of the accumulating and conveying device.

As shown in FIG. 6, an accumulation and transfer device 40 has a first robot 41 that is identical to the preceding robot 18, and a second robot 42 that ensures the second transfer from a stationary accumulation table 43 onto an output conveyor. This embodiment makes it possible to increase the ratio of the usable accumulation surface to the layout area of the device 40. Actually, the entire surface of the accumulation table 43 can be used to accumulate objects.

A variant of the accumulating and conveying device 40 comprises robots 41 and 42 each having three axes of movement. The manipulation head of the first robot 41 can go seek the row of objects to be transferred onto the feed conveyor so that at the moment when the manipulation head picks up the row, the head advances at the speed of the feed conveyor. Thus, the transfer can be accomplished without halting the feed conveyor. Likewise, the second robot 42 can place the transferred row onto the output conveyor without the latter being halted.

Using FIGS. 7 and 8, a device will be described for transferring to a multi-track output device 44 that feeds a downstream machine M2, for example of the bundling machine type. The feed device 32 is for example similar to the one described above. The output device 44 comprises a conveyor 45 forming a number of tracks, in this case three tracks in FIGS. 7 and 8.

Figure 7:
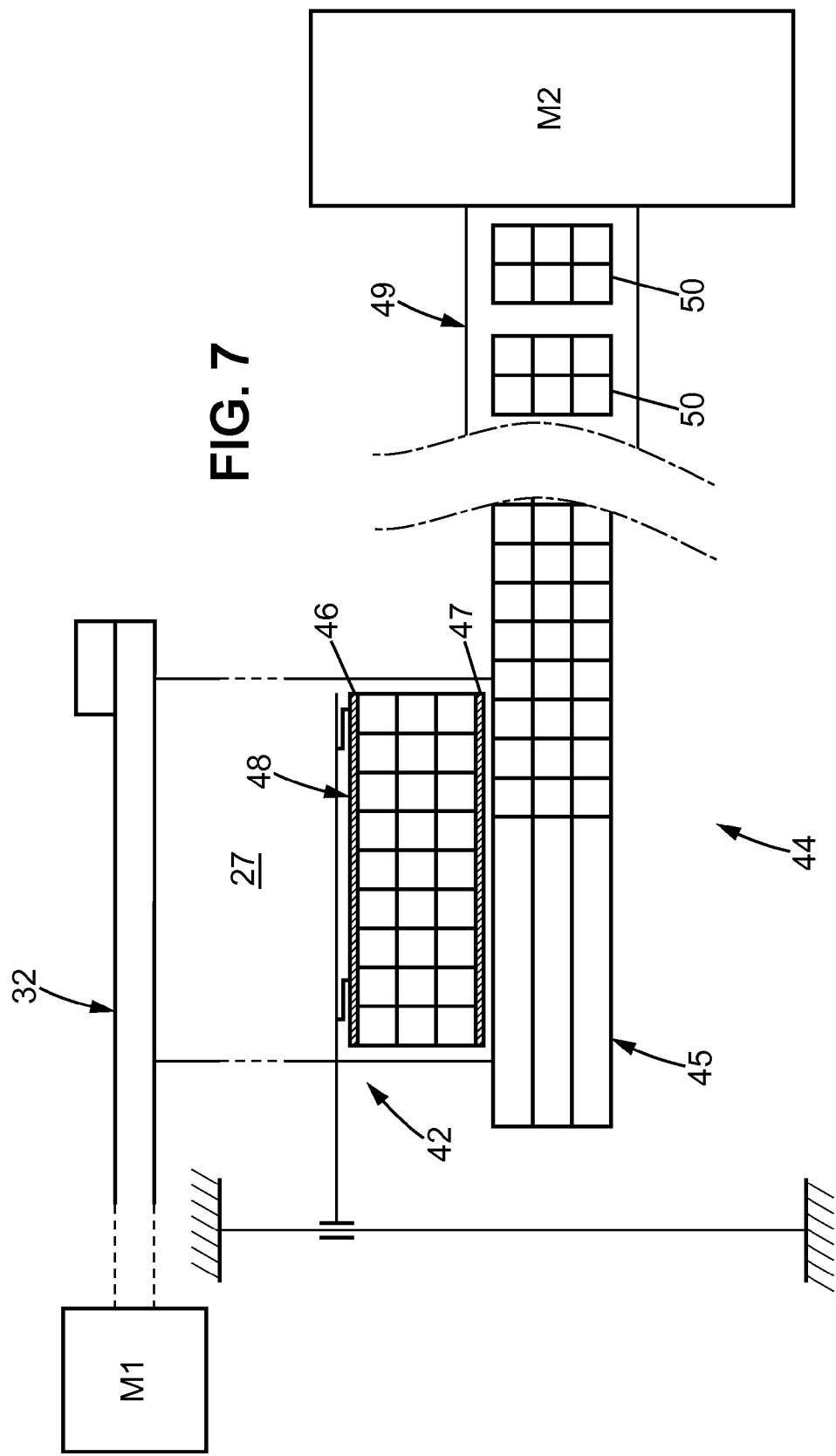
FIGS. 7 and 8 are top views of another embodiment of the accumulating and conveying device and respectively illustrate two steps of the corresponding transfer.
Figure 8:
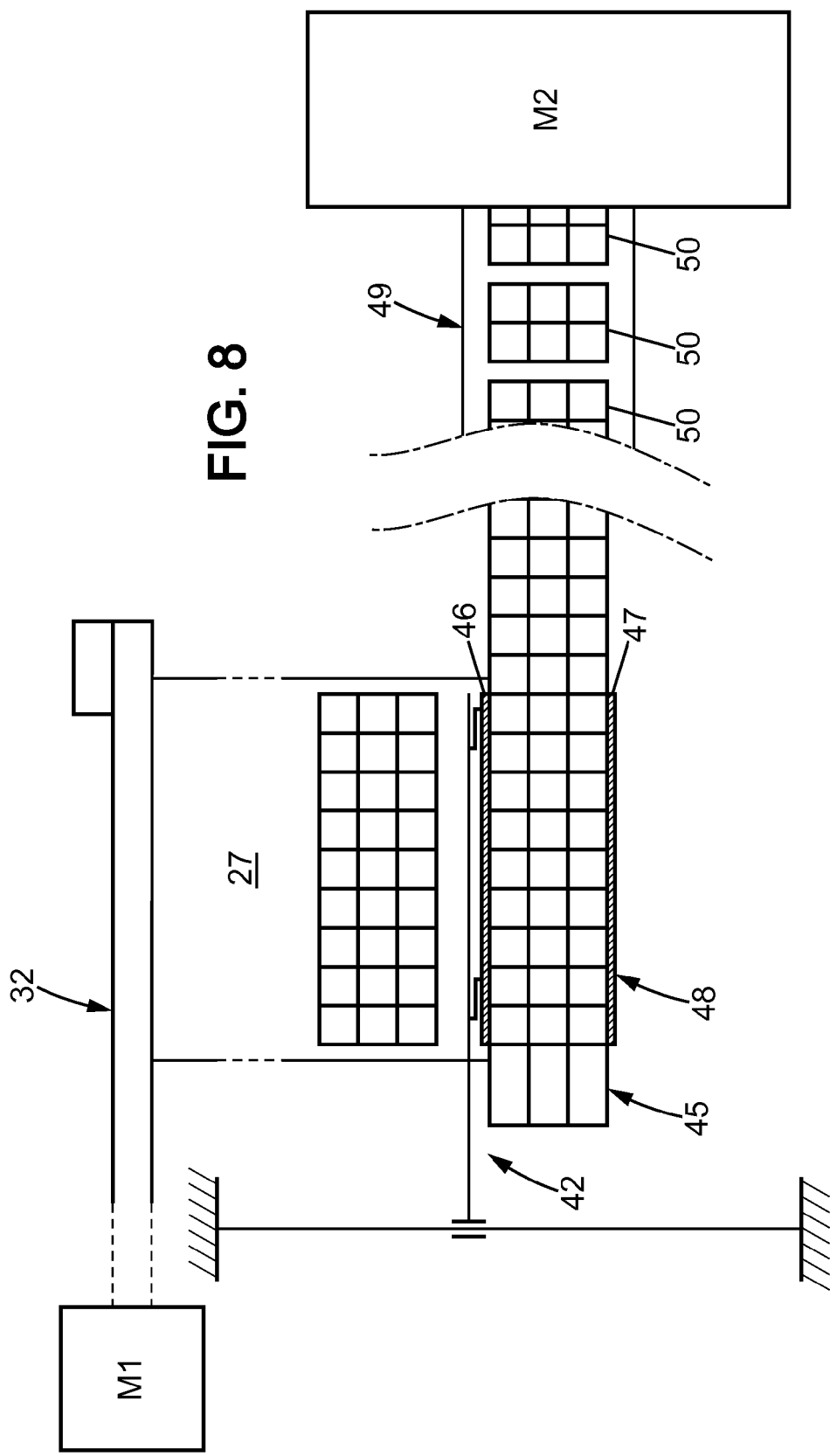

The case where three rows of objects are available on the accumulation surface 43 has been depicted in FIG. 7. The second robot 42 can then move at least two rows of objects, with the number of rows moved by the second robot 42 corresponding, for example, to the number of tracks available on the output conveyor 45, i.e., three in the example illustrated. For this purpose, the sides 46, 47 of the manipulation head 48 of the second robot 42 are some distance apart so as to be able to come on both sides of the object rows. The second robot 42 imparts an acceleration to the manipulation head 48, so that the upstream side 46 pushes the rows of objects onto the output conveyor. The downstream side 47 makes it possible, for example, to hold the objects to prevent them from falling during the push by the upstream side 46, and also to be able to decelerate the objects once positioned on the output conveyor 45.

The speed of movement of the second robot 42 is regulated as a function of the speed of the output conveyor 45, so that the tracks of the output conveyor 45 are free to receive the objects pushed by the second robot 42 at each cycle. Thus, the output conveyor 45 has no need to be halted.

It can also be envisioned that the output conveyor 45 comprises more tracks than the number of rows moved by the second robot 42. In this case, the speed of movement of the second robot 42 is here again adjusted to ensure the continuous feeding of the bundling machine M2 on all of the tracks.

The output conveyor 45 is extended by an input conveyor 49 of the bundling machine M2. Between the output conveyor 45 and the input conveyor 49 of the bundling machine, the output device 44 comprises means, not shown, for forming batches 50. Thus, the objects arrive by batch 50 into the bundling machine M2.

The positioning of a multi-track conveyor 45 at the output of the accumulation table makes it possible to eliminate a switching device to switch from one conveying track to several conveying tracks.

Figure 9:
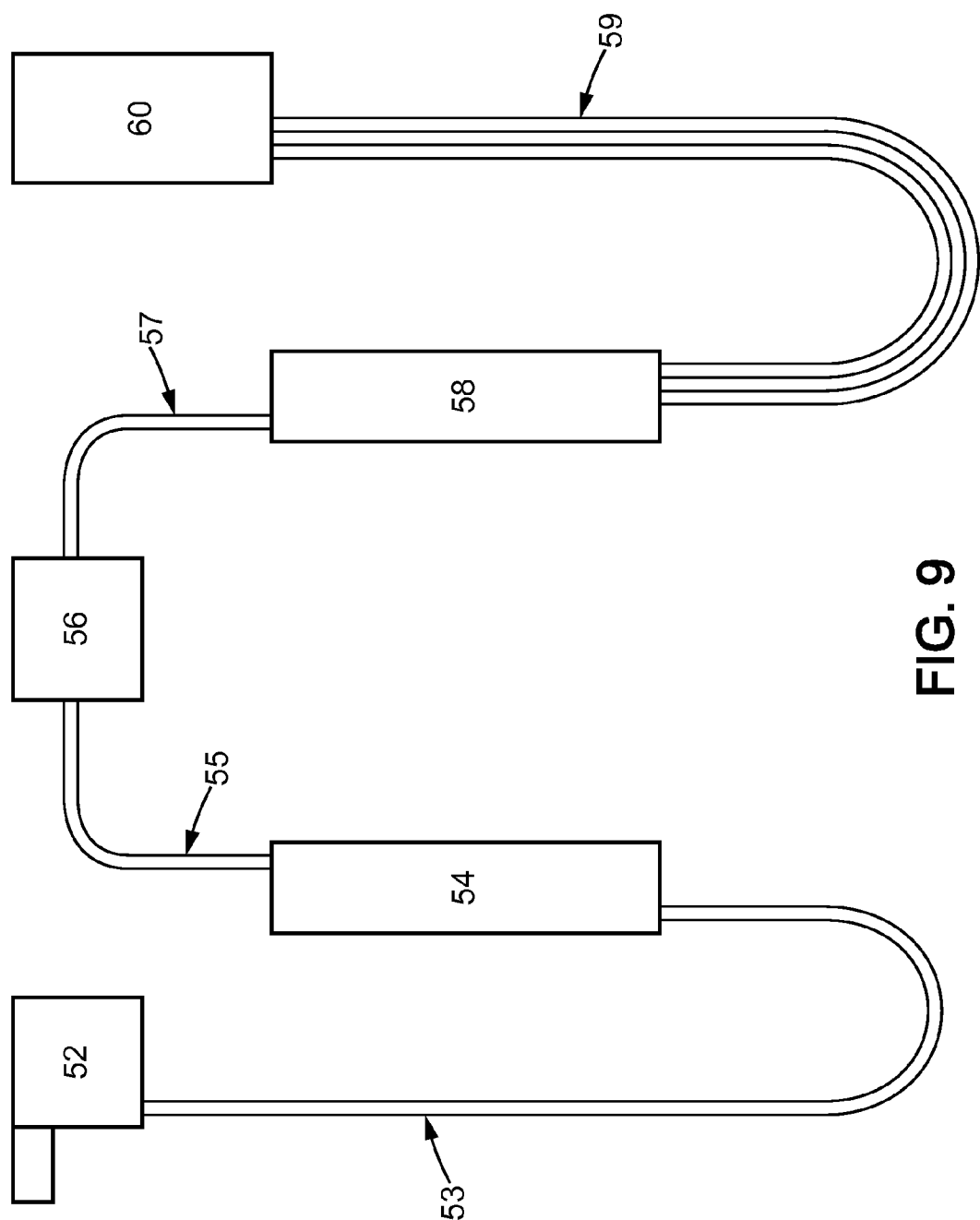
FIG. 9 is a diagrammatic representation, top view, of a production line equipped with accumulators.

The space occupied by the overall installation is thus reduced. Thus, for example, for a production line 51 of containers of plastic material as illustrated diagrammatically in FIG. 9, the line 51 can comprise successively:
- a blowing and filling station 52 in which the containers are shaped and filled,
- a first conveyor 53 having a single track,
- a first accumulation device 54, with the containers arriving and exiting for example onto a single track as described above with reference to FIGS. 1 to 6,
- a second conveyor 55 having a single track,
- a labeling apparatus 56, in which a label is affixed to the containers,
- a third conveyor 57 having a single track,
- a second accumulation device 58, with the containers arriving on a single track and exiting for example on three tracks as described above with reference to FIGS. 7 and 8,
- a multi-track conveyor 59,
- a bundling machine 60 to form the bundles of containers.

The invention claimed is:

1. A device (2, 40) for accumulation and transfer of objects (1): comprising:
    a feed conveyor (6), having a downstream portion (6b) that extends in a first conveying direction;
    an output conveyor (8, 45), having an upstream portion (8a) that extends in a second conveying direction;
    an accumulation surface (27, 43);
    a first transfer means (18, 41) to move at least one batch of objects from the feed conveyor onto the accumulation surface; and
    a second transfer means (7, 42) to move at least one batch of objects from the accumulation surface onto the output conveyor,
    wherein at least one of the first and second transfer means comprises a robotic manipulator (18, 41, 42) equipped with a head (17, 48) for manipulating at least one batch of objects, and
    wherein the accumulation surface (27, 43) comprises an upstream side, adjacent to the downstream portion (6b) of the feed conveyor (6), and a downstream side, opposite the upstream side in an accumulation direction that is angled with respect to at least one of the conveying directions, with said downstream side being adjacent to the upstream portion (8a) of the output conveyor (8).

2. The device according to claim 1, wherein the accumulation direction is perpendicular to the conveying direction of the feed conveyor (6) or of the output conveyor (8, 45) that deals with the transfer by the robotic manipulator (18, 41, 42).

3. The device according to claim 1, wherein one of the first and second transfer means comprises said robotic manipulator (18, 41, 42), with the other of said first and second means comprising an accumulation conveyor (7) equipped with a rotary mat, where said rotary mat extends along said accumulation surface (27) and is driven in a conveying direction that is essentially perpendicular to a conveying direction of the feed or output conveyor that deals with the transfer.

4. The device according to claim 3, wherein the robotic manipulator (41, 42) has three axes of movement, with the manipulation head (17, 48) being able to move forward at the speed of the feed or output conveyor that deals with the transfer.

5. The device according to claim 1, wherein the device further comprises a means (29) for determining a fill rate in progress on the accumulation surface (27) and a control unit (28) for the robotic manipulator (18, 41, 42) that is connected to said determination means (29), and wherein the manipulation head (17, 48) can move between a predetermined position (a, b) above the feed or output conveyor (6) and a variable position (c, d) above the accumulation surface (27), with said variable position (c) being determined by the central processing unit (28) as a function of the fill rate in progress.

6. The device according to claim 4, wherein the first transfer means comprises a robotic manipulator (18, 41), with the variable destination position (c) of the transferred row being determined so as to push the rows of objects against one another that have been previously transferred and are still on the accumulation conveyor (7).

7. The device according to claim 1, wherein the manipulation head (17, 48) can move vertically between an active position (b, c) and a retracted position (a, d), and comprises a first lateral pusher (24, 46) that extends parallel to the conveying direction of the feed or output conveyor (6) and is designed to extend in the active position all along one exterior side of the batch of objects to be transferred.

8. The device according to claim 1, wherein the manipulation head (17, 48) is a U-shaped cap, with the shape of the U being visible in a plane that is perpendicular to the conveying direction of the feed or output conveyor.

9. The device according to claim 1, further comprising:
a device (32) for feeding the objects that includes the feed conveyor (6) and an intermediate accumulation means (33) situated upstream from the feed conveyor, and/or comprises an output device (35) for the objects that includes the output conveyor (8, 45) and an intermediate accumulation means (36) situated downstream from the output conveyor.

10. The device according to claim 9, wherein the intermediate accumulation means (37, 36) comprises an intermediate conveyor (4, 9) with a smooth mat, followed by a braking device (5, 10).

11. The device according to claim 1, wherein the second transfer means comprises a robotic manipulator (42), with the objects being situated in rows on the accumulation surface (27, 43), where the output conveyor (45) is a multi-track conveyor, the manipulation head (48) of the robotic manipulator (42) has at least one pusher (46), and the robotic manipulator (42) exerts a pushing force on a number of rows of objects that is greater than or equal to two.

12. The device according to claim 11, wherein the robotic manipulator (42) exerts a pushing force on a number of rows of objects corresponding to the number of tracks of the output conveyor (45).

13. The device according to claim 2, wherein one of the first and second transfer means comprises said robotic manipulator (18, 41, 42), with the other of said first and second means comprising an accumulation conveyor (7) equipped with a rotary mat, where said rotary mat extends along said accumulation surface (27) and is driven in a conveying direction that is essentially perpendicular to a conveying direction of the feed or output conveyor that deals with the transfer.

14. The device according to claim 13, wherein the robotic manipulator (41, 42) has three axes of movement, with the manipulation head (17, 48) being able to move forward at the speed of the feed or output conveyor that deals with the transfer.

15. A method of transferring batches of objects (1) from a feed conveyor (6) onto an output conveyor (8, 45), comprising the steps of:

transferring, using a first means (18, 41), at least one batch of objects from the feed conveyor (6) onto an accumulation surface (27, 43), where the accumulation surface comprises an upstream side, adjacent to the downstream portion of the feed conveyor, and a downstream side, opposite the upstream side in an accumulation direction that is angled with respect to at least one of the conveying directions, with said downstream side being adjacent to the upstream portion of the output conveyor;

transferring, using a second means (7, 42), the at least one batch of objects from the accumulation surface onto the output conveyor (8, 45);

determining, via a determination means, a fill rate in progress on the accumulation surface; and positioning, via a control unit that is connected to said determination means, at least one of the first and second transfer means at a variable position above the accumulation surface as a function of the determined fill rate in progress on the accumulation surface.

16. The method according to claim 15, wherein each of the first and second transfer means is synchronized by flow rate of objects with the corresponding feed or output conveyor.

17. The method according to claim 15, further comprising:
halting the feed conveyor (6) when the batch of objects is transferred from said feed conveyor (6); and
accelerating the feed conveyor (6) up to a catchup overspeed so that the mean transfer flow rate is equal to the mean feed flow rate.

18. The method according to claim 16, further comprising:
halting the feed conveyor (6) when the batch of objects is transferred from said feed conveyor (6); and
accelerating the feed conveyor (6) up to a catchup overspeed so that the mean transfer flow rate is equal to the mean feed flow rate.

19. The method according to claim 15, further comprising:
halting the output conveyor (8, 45) when the batch of objects is transferred onto said output conveyor (8, 45); and
accelerating the output conveyor (8, 45) up to a catchup overspeed so that the mean transfer flow rate is equal to the mean output flow rate.

20. The method according to claim 16, further comprising:
halting the output conveyor (8, 45) when the batch of objects is transferred onto said output conveyor (8, 45); and
accelerating the output conveyor (8, 45) up to a catchup overspeed so that the mean transfer flow rate is equal to the mean output flow rate.

* * * * *